United States Patent

Nagashima

[11] Patent Number: 5,510,677
[45] Date of Patent: Apr. 23, 1996

[54] METHOD FOR CORRECTING THE EFFECT OF TERRESTRIAL MAGNETISM ON ELECTRON BEAM TRACKING

[75] Inventor: Masaru Nagashima, Kanagawa, Japan

[73] Assignee: Sony Corporation, Tokyo, Japan

[21] Appl. No.: 273,074

[22] Filed: Jul. 11, 1994

[30] Foreign Application Priority Data

Jul. 9, 1993 [JP] Japan ................................ 5-170342

[51] Int. Cl.⁶ ............................ H05B 37/02; H01J 29/06
[52] U.S. Cl. .................... 315/8; 315/85; 315/370
[58] Field of Search ........................ 315/8, 85, 370; 313/352

[56] References Cited

U.S. PATENT DOCUMENTS 3,571,652  3/1971  Shiebara et al. .................. 315/8
5,148,083  9/1992  Hatada .......................... 315/8

FOREIGN PATENT DOCUMENTS 3-39987   4/1991  Japan .
4-61590   2/1992  Japan .
4-302596  10/1992 Japan .
5-328374  12/1993 Japan .

*Primary Examiner*—Robert J. Pascal
*Assistant Examiner*—Michael Shingleton

[57] ABSTRACT

A method and apparatus for correcting the tracking of an electron beam which includes the steps of generating a supplemental magnetic field, generating a reverse magnetic field and removing the correcting magnetic field. The direction of the supplemental magnetic field is substantially the same as the direction of a terrestrial magnetism. The reverse magnetic field substantially offsets the terrestrial magnetism.

12 Claims, 5 Drawing Sheets

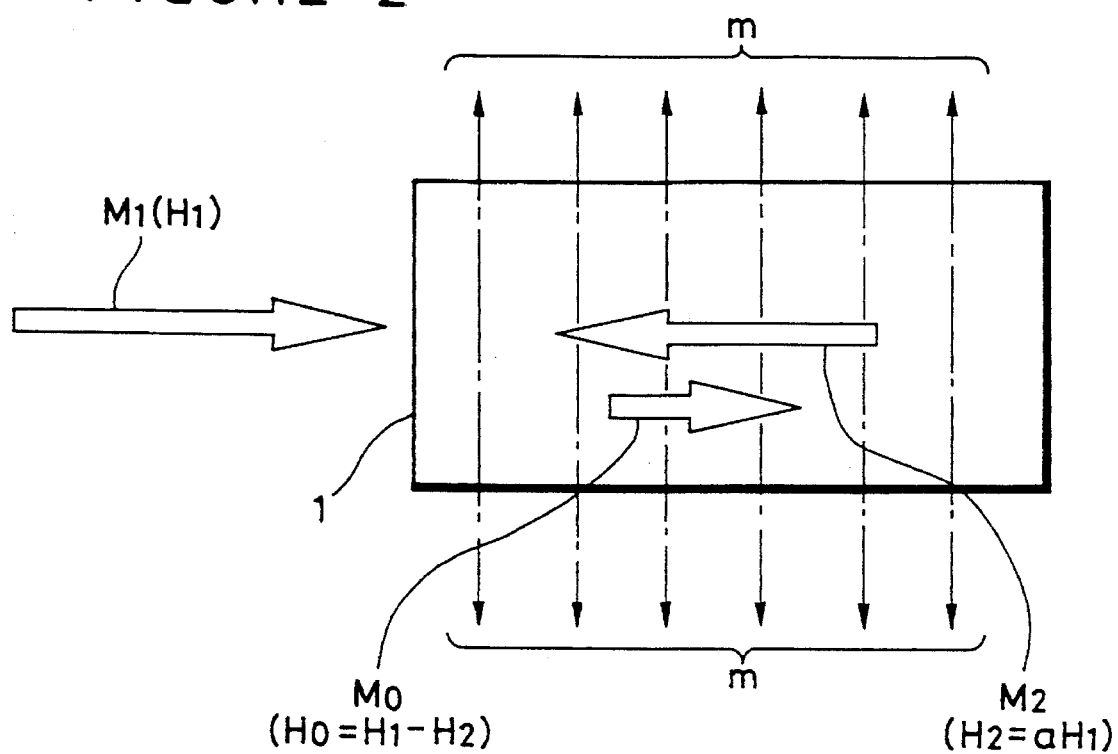

METHOD FOR CORRECTING THE EFFECT OF TERRESTRIAL MAGNETISM ON ELECTRON BEAM TRACKING

FIELD OF THE INVENTION

This invention relates to a method for correcting the tracking of an electron beam. More particularly this invention relates to a method for correcting the effect of terrestrial magnetism on the tracking of an electron beam which is used to excite, or illuminate, a cathode ray tube.

BACKGROUND OF THE INVENTION

In cathode ray tubes, such as those used in color television sets or computer display monitors and the like, it is important that the electron beam used to excite, or illuminate, the CRT screen be properly aligned so as to strike or excite only the intended point or pixel (pixels). Where the electron beam fails to strike only the intended pixel or pixels, undesirable results such as improper color or general lack of image clarity, or sharpness, may result. Since electron beams used in common cathode ray tubes are sensitive to magnetic fields or magnetisms, a typical CRT such as that used in a color television set and the like, can be affected by external magnetic fields or magnetisms, such as terrestrial magnetism. The result is often poor image quality. More particularly, external magnetic fields, such as terrestrial magnetism can affect the electron beam tracking so as to cause the beam to misland, or not strike the desired target point (pixel or pixels). Where the electron beam strikes the desired target point, the electron beam is said to have made a perfect landing.

Generally, terrestrial magnetism causes a mislanding of an electron beam on a cathode ray tube. So a method for correcting a track of an electron beam which is used for a cathode ray tube has been required. Especially a method for correcting a track of an electron beam, of which a structure is not complicated, has been required to get a perfect landing of an electron beam on a cathode ray tube.

FIG. 2 is a view of a prior art which is disclosed in U.S. Pat. Nos. 3,571,652 and 5,148,083. In this case, a magnetism shielding board 1 is provided around a cathode ray tube. The magnetism shielding board 1 may be provided inside of a cathode or outside of a cathode ray tube.

FIG. 2 shows a case wherein the a direction of a terrestrial magnetism $M_1$ is from left to right. Generally demagnetization coils are provided at an upper side and a lower side of a cathode ray tube. The coil provided at the upper side is electrically connected to the coil provided at the lower side. An alternating attenuated electric current is flown to each demagnetization coil. An alternating attenuated magnetic field m having a direction which is perpendicular to the direction of the alternating attenuated electric current is generated by the alternating attenuated electric current. The direction of the alternating attenuated magnetic field m is also perpendicular to the direction of the terrestrial magnetism $M_1$. When the terrestrial magnetism $M_1$ and the alternating attenuated magnetic field m works on the CRT, a reverse magnetic field $M_2$ (a demagnetizing field) having a direction which is reverse, or opposite, to the direction of the terrestrial magnetism $M_1$, is generated on the CRT. Because the shielding board 1 is a paramagnetism material such as a silicon steel plate, the magnetic shielding board 1 is magnetized in the direction of the reverse magnetic field $M_2$ thereby.

The strength of the terrestrial magnetism $M_1$ is expressed as $H_1$. The strength of the reverse magnetic field $M_2$ is expressed as $H_2$. A strength $H_0$ of a total magnetic field $M_0$ is expressed as $H_0=H_1-H_2$. The strength $H_0$ of the total magnetic field $M_0$ correlates to a mislanding of an election beam on a cathode ray tube.

In this case, the strength $H_2$ of the reverse magnetic field $M_2$ is smaller than the strength $H_1$ of the terrestrial magnetism $M_1$. A relation between the strength $H_1$ and the strength $H_2$ is determined by the magnetism shielding board 1. Namely, the relation is expressed by the following formula:

$$H_2 = aH_1$$

When the magnetism shielding board 1 is made of a silicon steel plate, the value of a is from 0.3 to 0.6.

Thus, because the strength $H_2$ of the reverse magnetic field $M_2$ is absolutely smaller than the strength $H_1$ of the terrestrial magnetism $M_1$, the strength $H_0$ of the total magnetic field $M_0$ never becomes zero. So a mislanding of an electron beam on a cathode ray tube strick occurs even though a demagnetization coil and a magnetic shield boards are provided in a CRT for correcting a mislanding of an electron beam.

SUMMARY OF THE INVENTION

One object of this invention is to provide a method for correcting the tracking of an electron beam in order to get a perfect landing of an electron beam on the intended target pixel, or pixels.

According to a first embodiment of this invention, a method for correcting a track of an electron beam includes the steps of generating a supplemental magnetic field, generating a reverse magnetic field and removing the correcting magnetic field. The direction, or polarity, of the supplemental magnetic field is substantially the same as the direction of a terrestrial magnetism. The reverse magnetic field substantially offsets the terrestrial magnetism.

BRIEF DESCRIPTION OF THE DRAWINGS

FIG. 2 is a view showing a prior art.

DETAILED DESCRIPTION OF THE INVENTION

The present invention is explained as follows.

Figure 1A:
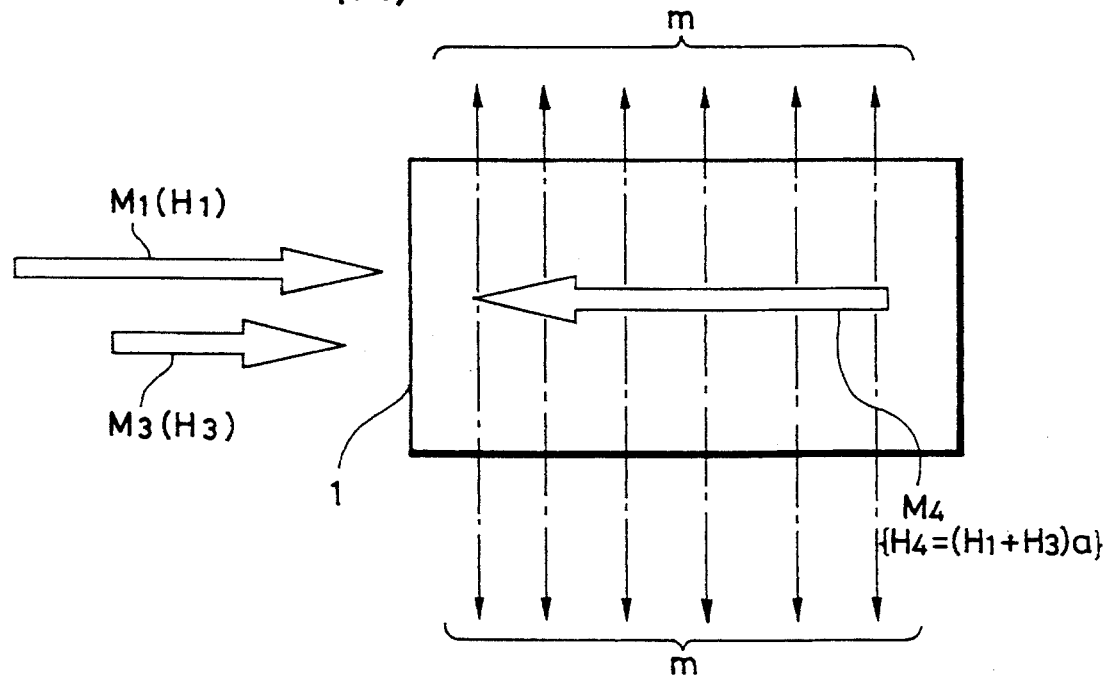
FIG. 1(A) is a view showing an example of a first step of the present invention.
Figure 1B:
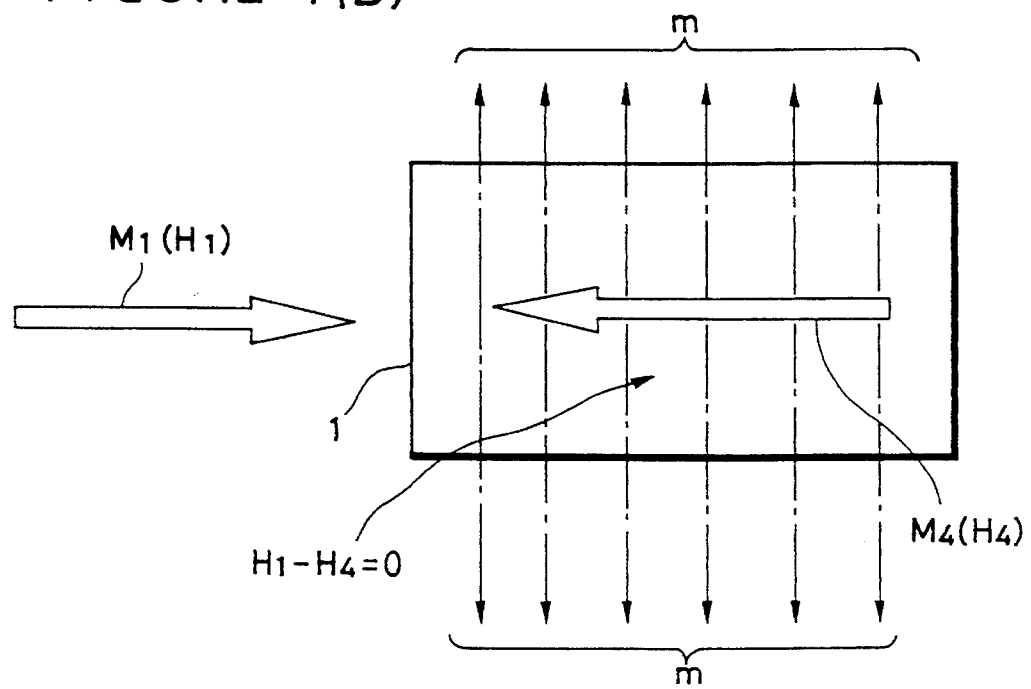
FIG. 1(B) is a view showing an example of a second step of the present invention.

FIG. 1(a) and FIG. 1(B) show an example of the method of the present invention.

When there is the magnetic field generated by the terrestrial magnetism $M_1$, the supplemental magnetic field $M_3$ is generated by flowing a certain DC current to a correct coil 6 as shown in FIG. 1(A). The direction of the supplemental magnetic field $M_3$ is the same direction as the terrestrial magnetism $M_1$. The supplemental magnetic field $M_3$ is superimposed on the terrestrial magnetism $M_1$ (a first step).

Under this condition, the alternating attenuated electric current is flown to the demagnetization coil 6.

The alternating attenuated magnetic field m having a direction which is perpendicular to the direction of the alternating attenuated electric current is generated from the demagnetization coil 6. The direction of the alternating attenuated magnetic field m is also perpendicular to the direction of the terrestrial magnetism $M_1$ and the supplemental magnetic field $M_3$. The terrestrial magnetism $M_1$, the supplemental magnetic field $M_3$ and the alternating attenuated magnetic field m work on the CRT, a reverse magnetic field $M_4$ (a demagnetizing field) having a direction which is reverse, or opposite, to the direction of the terrestrial magnetism $M_1$, is generated on the CRT. Because the shielding board 1 is a paramagnetic material such as a silicon steel plate, the magnetic shielding board 1 is magnetized in the direction of the reverse magnetic field $M_4$ thereby.

The strength $H_3$ of the supplemental magnetic field $M_3$ is controlled by an ,electric current flown to the supplemental coil 6 so that the strength $H_1$ of the terrestrial magnetism $M_1$ becomes equal to the strength $H_4$ of the reverse magnetic field $M_4$. Namely the supplemental magnetic field $M_3$ having the strength $H_3$ is generated so as to satisfy the following formula.

$$H_1 = H_4 = (H_1 + H_3) \, a$$

Under this condition, the supplemental magnetic field $M_3$ is removed as shown in FIG. 1B so that the reverse magnetic field $M_4$ magnetizing the magnetic shield board 1 offsets the terrestrial magnetism $M_1$ completely inside of the cathode ray tube (a second step). Magnetic sheilding board 1 retains a residual magnetism after supplemental coil is de-energized. No magnetic field is generated thereby ($H_1 - H_4 = 0$).

As a result, an electron beam is not affected by the terrestrial magnetism $M_1$. Therefore a mislanding of an electron beam is corrected or otherwise avoided.

For example, a magnetomotive force generated by the demagnetization coil 5 is 2500–2600 AT. A magnetomotive force generated by the supplemental coil 6 is 12.5–15 AT.

Figure 3:
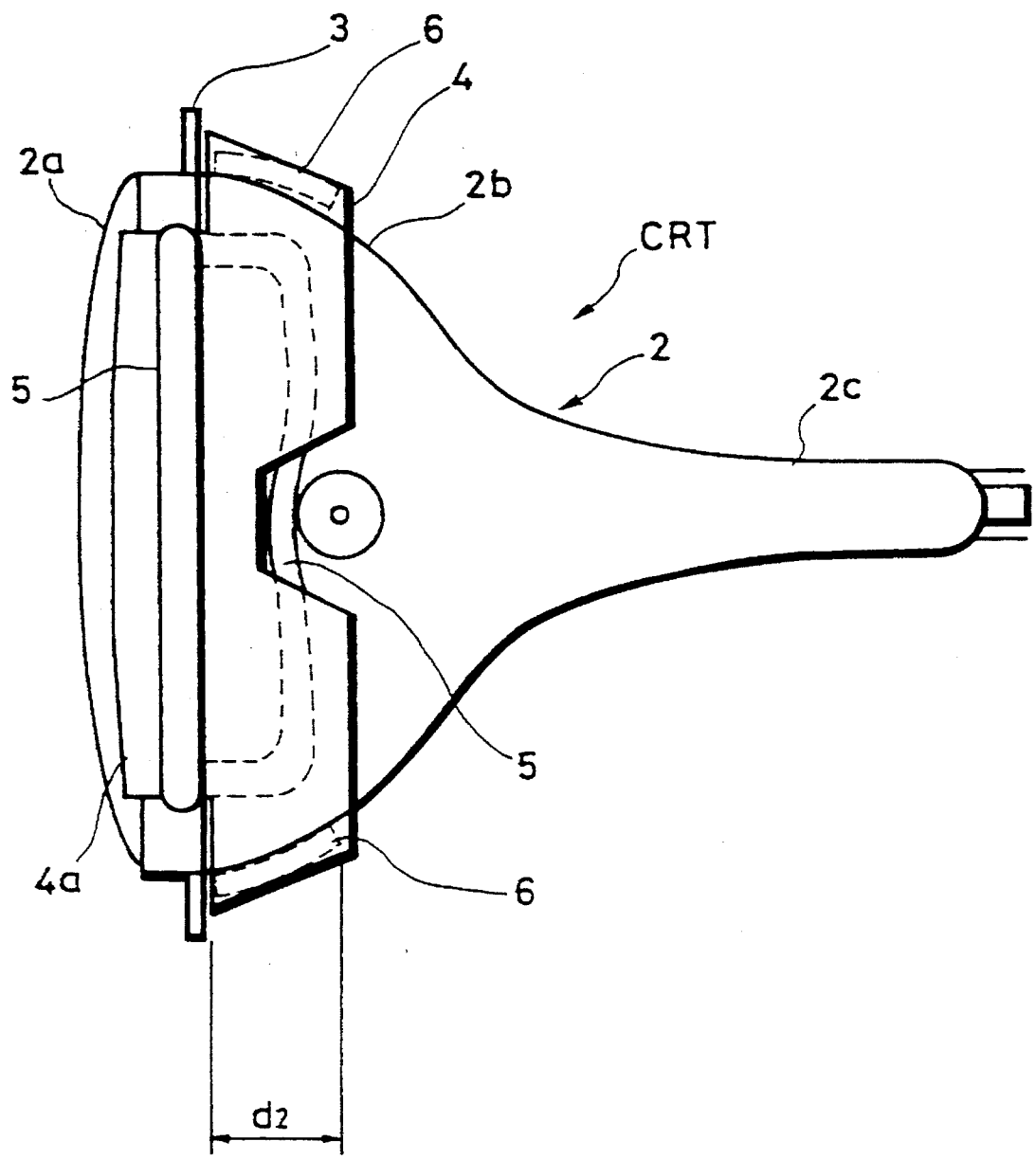
FIG. 3 is a plan view showing an example of the apparatus of the present invention.
Figure 4:
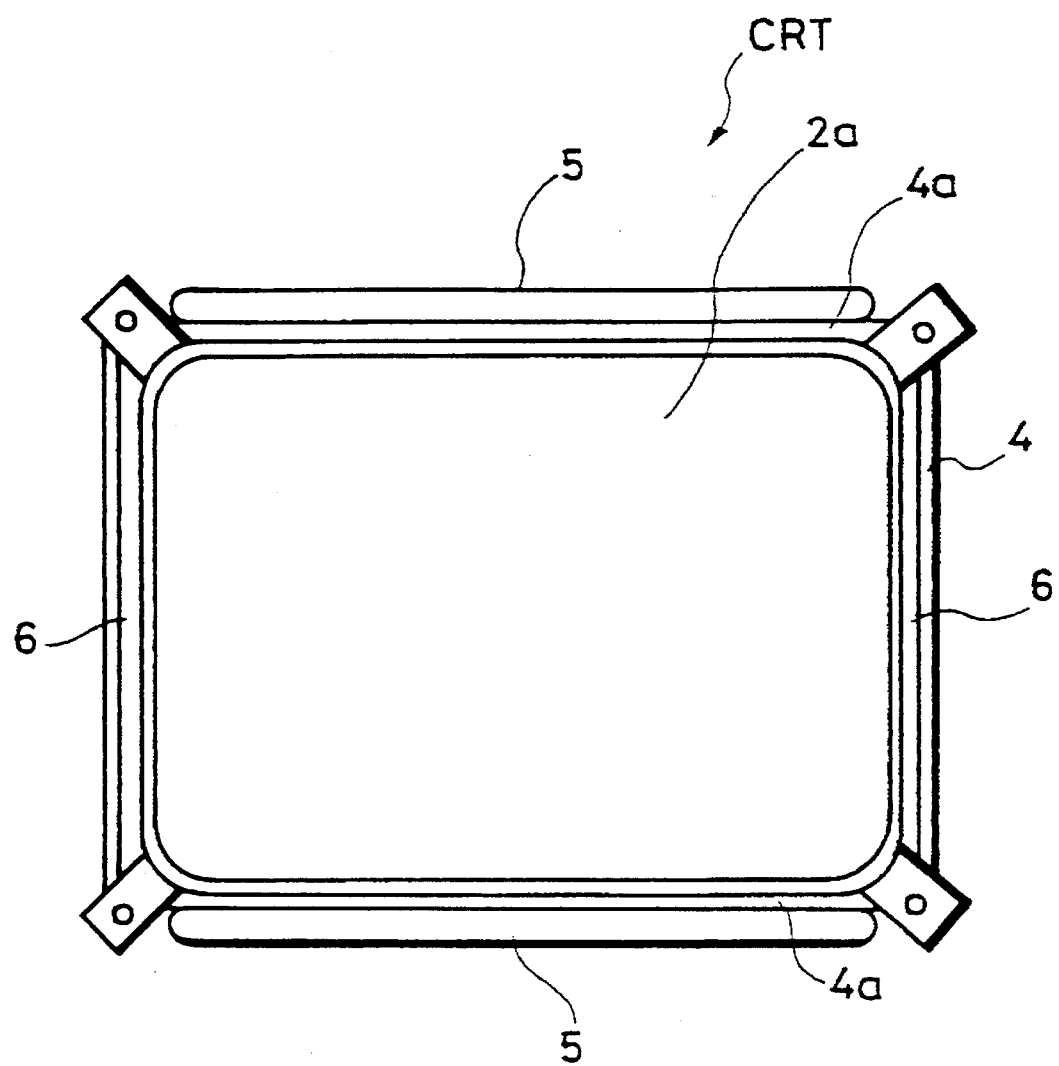
FIG. 4 is a front view showing an example of the apparatus of the present invention.
Figure 5:
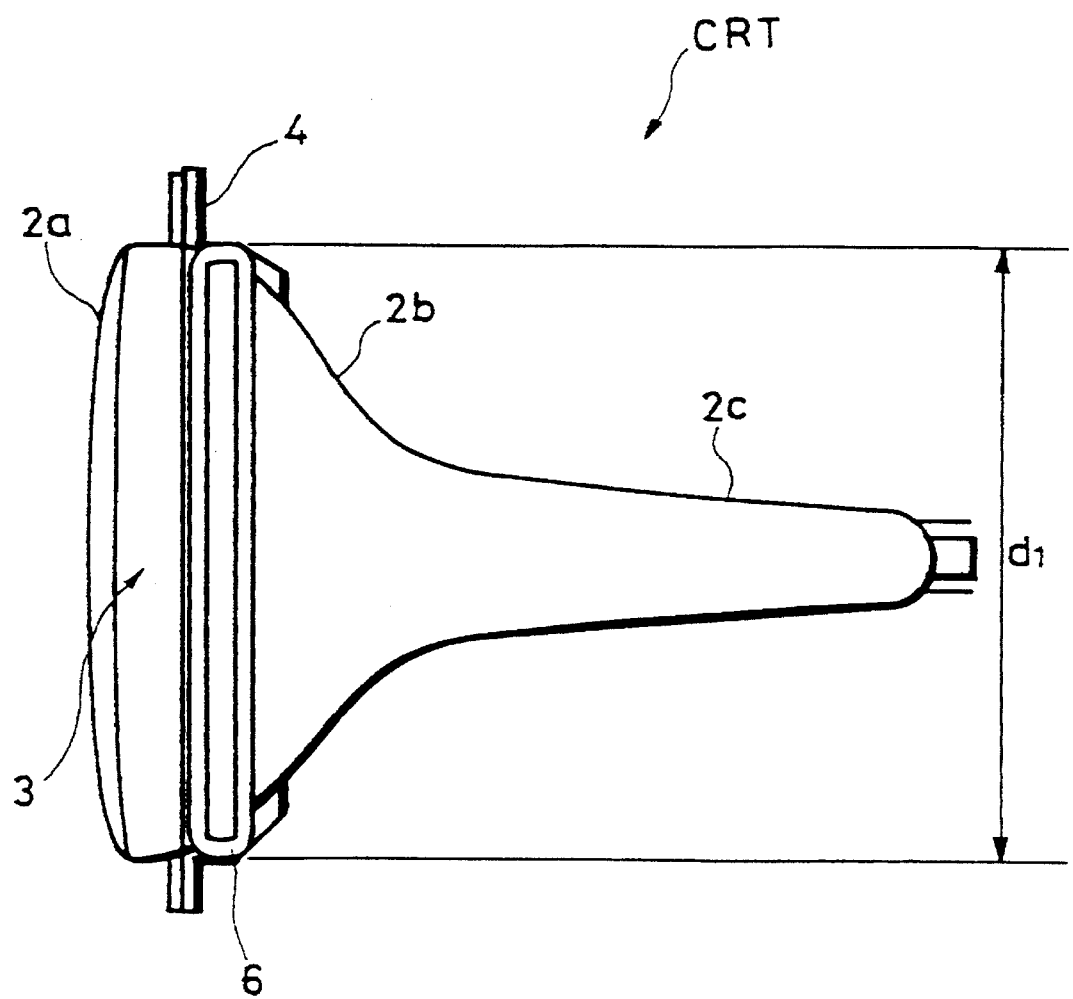
FIG. 5 is a side showing an example of an apparatus of the present invention.

FIG. 3, FIG. 4 and FIG. 5 show a cathode ray tube which is an apparatus for practicing this invention. The cathode ray tube 2 has a panel 2a, a funnel 2b and a neck 2c.

An explosion-proof band 3 is attached to the circumference of the panel 2a. An outside magnetic shielding board 4 is provided so as to surround the funnel 2b. The upper and lower parts of the outside magnetic shielding board 4 are extended in the direction of the panel 2a as shown in FIG. 3. The extended parts are mount parts 4a. A shape of a demagnetization coil 5 is, for example, almost a rectangle or an ellipse. The demagnetization coils 5 are attached at the upper side and the lower side of the CRT. The demagnetization coil 5 of the upper side is electrically connected to the demagnetization coil 5 of the lower side in series. Further the demagnetization coil 5 of the upper side is located on the extended magnetic shielding board 4a at the extended magnetic shielding board 4a and located between the magnetic shield board 4 and the funnel 2b at the magnetic shielding board 4 as shown in FIG. 3. The demagnetization coil 5 is connected to a driving circuit which is not shown in FIG. 3.

A supplemental coil 6 for generating a supplemental magnetic field $M_3$ is provided at the right side and the left side of the funnel 2b as shown in FIG. 3 and FIG. 5. The shape of the supplemental coil 6 is, for example, almost a rectangle of a or an ellipse. The supplemental coil 6 is fixed between the cathode ray tube 2 and the outside magnetic shielding board 4 as shown in FIG. 3 and FIG. 4. Further the supplemental coil 6 at the right side is electrically connected to the supplemental coil 6 at the left side in series. The supplemental coil 6 is connected to a driving circuit which is not shown in FIG. 3. For example, in the case of the cathode ray tube of 20 inch, the supplemental coil 6 may have a length of 360 mm ($d_1$) in a y axis and a length of 50 mm ($d_2$) in a z axis as shown in FIG. 3 and FIG. 5.

An inside magnetic shielding board is provided so as to surround a color selective electrode in the cathode ray tube 2 (not shown in figure). For example, the outside magnetic shielding board 4 and the inside magnetic shielding board are made of a silicon steel plate. The color selective electrode has a pair of supporting parts which are opposite to each other, a pair of metal frames which are elastic and are provided between the ends of the supporting parts and a plurality of band-shaped grids which are tightened between the supporting parts in a certain pitch so as to form a plurality of slits there between. The color selective electrode is called, for example, an aperture grille. The color selective electrode is provided so that a lot of band-shaped grids are tightened between the supporting parts, namely in a vertical direction in FIG. 4.

In the above described cathode ray tube, the supplemental magnetic field $M_3$ is generated in the same direction (the direction of X axis) as the terrestrial magnetism $M_1$ by flowing a certain DC current to the supplemental coil 6. Under this condition, the alternating attenuated magnetic field m is generated by flowing a certain alternating electric current to the demagnetization coil 5. Because the terrestrial magnetism $M_1$, the supplemental magnetic field $M_3$ and the alternating attenuated magnetic field m work on the CRT, the reverse magnetic field $M_4$ is generated as a demagnetizing field on the CRT. The magnetic shielding board 1 is magnetized thereby so as to offset the terrestrial magnetism $M_1$ completely. After that, the supplemental magnetic field $M_3$ is removed by cutting the DC current flow to the supplemental coil 6. All magnetic material parts in or on the CRT such as the outside magnetism shielding board 4, the inside magnetic shielding board and the color selective electrode 1 are magnetized thereby (and thus retain a residual magnetism) so that the reverse magnetic field $M_4$ of which strength $H_4$ is almost equal to the strength $H_1$ of the terrestrial magnetism $M_1$. As a result, the reverse magnetic field $M_4$ offsets the terrestrial magnetism $M_1$, thereby providing for electron beam to be corrected or otherwise avoided.

It is not necessary to flow an electric current to the supplemental coil 6 constantly in the present invention because of the residual magnetic field produced. Further it is not necessary to provide a plurality of supplemental coils in the cathode ray tube. Thus, the driving circuit may be simplified and the consumption of electric power by the apparatus may be decreased.

Further because the demagnetization coil 5 and the supplemental coil 6 are attached to the cathode ray tube of the present invention, a track of an electron beam is corrected easily regardless of the size of the cathode ray tube.

This invention is not limited to the above described embodiment. For example, it is not required that the strength of the reverse magnetic field be absolutely equal to the strength of the terrestrial magnetism. The strength of the reverse magnetic field is determined so as not to produce a mislanding of an electron beam. In other words, it is important that the reverse magnetic field and the terrestrial magnetism be substantially canceled by each other.

The example of this invention shows the cathode ray tube having an outside magnetic shielding board and an inside magnetic shielding board. However this invention can be applied to a cathode ray tube having only an outside magnetic shielding board or only an inside magnetic shielding board.

The position, number and shape of a supplemental coil or a demagnetization coil can be modified to correspond with the type of cathode ray tube.

A sensor detecting a strength of a terrestrial magnetism can be provided in a cathode ray tube so that an electric current is flown to a correct coil based on the information obtained by the sensor in order to correct a track of an electron beam.

This invention allows for a mislanding of an electron beam to be substantially, if not completely, corrected. Further, it provides for improved luminance of a cathode ray tube, improved uniformity of a chromaticity and convergence in the cathode ray tube.

It is preferable that the direction of the supplemental magnetic field be arranged so as to be perpendicular to the direction of the alternating attenuated magnetic field. It makes a luminance, a uniformity of a chromaticity and a convergence more improved.

While this invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as falling within the scope of the appended claims.

What is claimed is:

1. A method for correcting the tracking of an electron beam comprising the steps of:
   generating a supplemental magnetic field having a direction which is substantially the same as the direction of a terrestrial magnetism;
   generating a reverse magnetic field, which has a magnitude and direction which is sufficient to substantially offset said terrestrial magnetism;
   removing said supplemental magnetic field; and
   generating an electron beam for illuminating a desired target on a CRT display.

2. A method for correcting the tracking of an electron beam to offset the effect of terrestrial magnetism in a cathode ray tube comprising the steps of:
   generating a supplemental magnetic field by flowing a certain DC electric current to a supplemental coil, a direction of said supplemental magnetic field being substantially the same as the direction of a terrestrial magnetism;
   generating an alternating attenuated magnetic field by flowing an alternating attenuated electric current to a demagnetization coil;
   generating a reverse magnetic field relating said terrestrial magnetism and said supplemental magnetic field, said reverse magnetic field magnetizing a magnetic material part on said cathode ray tube and substantially offsetting said terrestrial magnetism; and
   removing said correcting magnetic field.

3. A method for correcting a track of an electron beam according to claim 2, wherein the direction of said alternating attenuated magnetic field is substantially perpendicular to the direction of said correcting magnetic field.

4. A method for correcting a track of an electron beam according to claim 2, wherein said magnetic material part is an outside magnetic shielding board.

5. A method for correcting a track of an electron beam according to claim 2, wherein said magnetic material part is an inside magnetic shielding board.

6. A method for correcting a track of an electron beam according to claim 2, wherein said magnetic material part is a color selective electrode.

7. A method for correcting a track of an electron beam according to claim 2, wherein each of said supplemental coil for generating said supplemental magnetic field is provided at a right side and a left side of a funnel of said cathode ray tube.

8. A method for correcting a track of an electron beam according to claim 2, wherein each of said demagnetization coil for generating an alternating attenuated magnetic field are provided at an upper side and a lower side of a panel of said cathode ray tube.

9. A method of correcting the tracking of an electron beam in a cathode ray tube, so as to substantially offset the effects of terrestrial magnetism, said method comprising the steps of:
   generating a supplemental magnetic field which has a direction which is substantially equal to the direction of the terrestrial magnetism;
   generating a reverse magnetic field which has a magnitude and a direction substantially opposite to the magnitude and direction of said terrestrial magnetism;
   removing said correcting magnetic field; and
   generating an electron beam for illuminating a desired target on a CRT display.

10. An apparatus for correcting the affect of terrestrial magnetism on the tracking of an electron beam in a cathode ray tube comprising:
    a supplemental coil for generating a supplemental magnetic field;
    said supplemental magnetic field having a direction which is substantially equal to the direction of said terrestrial magnetism;
    a demagnetization coil for generating an alternating attenuated magnetic field;
    a magnetic assembly mounted on said cathode ray tube for generating a reverse magnetic field having magnitude and direction which is substantially equal and opposite to said terrestrial magnetism;
    said magnetic assembly is magnetized by said reverse magnetic field; and
    means for generating an electron beam for illuminating a desired target on said cathode ray tube.

11. An apparatus for correcting the affect of terrestrial magnetism on the tracking of an electron beam in a cathode ray tube according to claim 10, wherein said supplemental magnetic field is perpendicular to the direction of said alternating attenuated magnetic field.

12. An apparatus for correcting the affect of terrestrial magnetism on the tracking of an electron beam in a cathode ray tube comprising:
    a supplemental coil for generating a supplemental magnetic field;
    said supplemental magnetic field having a direction which is substantially equal to the direction of a terrestrial magnetism;

a demagnetization coil for generating an alternating attenuated magnetic field;

a magnetic assembly mounted on said cathode ray tube for generating a reverse magnetic field having substantially equal and opposite magnitude and direction of said terrestrial magnetism;

said magnetic assembly is magnetized by said reverse magnetic field;

means for generating an electron beam for illuminating a desired target on said cathode ray tube; and said supplemental magnetic field is perpendicular to the direction of said alternating attenuated magnetic field.

* * * * *